United States Patent [19]

Hunter et al.

[11] E Patent Number: Re. 33,144

[45] Reissued Date of Patent: Jan. 9, 1990

[54] VEHICLE WHEEL ALIGNMENT APPARATUS

[75] Inventors: Lee Hunter, Creve Coeur; Daniel B. January, Bel-Ridge, both of Mo.

[73] Assignee: Hunter Engineering Company, Bridgeton, Mo.

[21] Appl. No.: 443,381

[22] Filed: Nov. 22, 1982

Related U.S. Patent Documents

Reissue of:

[64] Patent No.: 3,021,047
Issued: Nov. 24, 1981
Appl. No.: 81,102
Filed: Oct. 2, 1979

[51] Int. Cl.[4] ..... G01B 11/26; G01B 5/24

[52] U.S. Cl. ..... 356/152; 33/288; 33/203.18; 356/155

[58] Field of Search ..... 356/152, 155; 33/288, 33/203.18, 336, 337

[56] References Cited

U.S. PATENT DOCUMENTS

| | | | |
|---|---|---|---|
| 3,181,248 | 5/1965 | Manlove | 33/203.18 |
| 3,533,699 | 10/1970 | Hopkins et al. | 356/152 |
| 3,865,492 | 2/1975 | Butler | 356/155 |
| 3,892,042 | 7/1975 | Senften | 33/288 |
| 4,095,902 | 6/1978 | Florer et al. | 356/155 |
| 4,097,157 | 6/1978 | Lill | 356/152 |
| 4,126,943 | 11/1978 | Senften | 356/155 |
| 4,138,825 | 2/1979 | Pelta | 33/288 |
| 4,180,326 | 12/1979 | Chang | 356/155 |

*Primary Examiner*—Stephen C. Buczinski
*Attorney, Agent, or Firm*—Gravely, Lieder & Woodruff

[57] ABSTRACT

Vehicle wheel alignment apparatus having active alignment determining means operatively mounted on the steerable and non-steerable wheels so as to be substantially insensitive to mechanical distortion of the vehicle wheels and operable in combination with wheel run out compensation means to produce wheel alignment results of improved accuracy, and utilizing the improved arrangement of alignment apparatus for supplying information which can be used for computing the important angular relationship of the wheels to a vehicle reference.

6 Claims, 3 Drawing Sheets

VEHICLE WHEEL ALIGNMENT APPARATUS

Matter enclosed in heavy brackets [ ] appears in the original patent but forms no part of this reissue specification; matter printed in italics indicates the additions made by reissue.

BACKGROUND OF THE INVENTION

The ideal geometric configuration of a four wheel vehicle is a rectangle in which: the steerable wheels will run parallel with each other and are equidistant from the center of the connecting axle or its equivalent; in which the non-steerable wheels will run parallel with each other and are equidistant from the center of the connecting axle or its equivalent; in which the non-steerable wheels either track with the steerable wheels or are equally off set from the steerable wheel tracks; and in which the vehicle body has its longitudinal geometric center line coincident with the longitudinal center line for the steerable and non-steerable wheels.

The practical and economic considerations involved in the production of wheeled vehicles taken into account the complications in connection with manufacturing tolerances present in the various parts and the possibility that tolerance mis-matching can build up variations from the ideal geometric configuration. As a consequence of the possible mis-matching of tolerances in the parts making up a finished vehicle provision is made for mechanically adjusting wheel positions relative to the chassis or body of a vehicle. In some vehicles all adjustments are found in the steerable wheel assemblies, while in others the adjustments are provided in both the steerable and non-steerable wheel assemblies. Generally vehicles are permitted to have some deviations from the ideal conditions of wheel alignment and wheel to body alignment. As along as the deviations are not regarded as serious the vehicle is put into use.

Wheel alignment apparatus has been disclosed by Manlove U.S. Pat. No. 3,181,284 of May 4, 1965 in relation to the steerable and non-steerable wheels of a vehicle. The objective of this disclosure is limited to mechanical apparatus in which mounting members are connected to the rim of the vehicle wheels without being compensated for run out or for mechanical variations in the shape of the wheel rims, and in which wheel alignment measurements are made from positions of the measuring apparatus which is displaced from positions representing the true alignment measuring positions. Vehicle wheel alignment apparatus of the electronic type is disclosed by Florer in U.S. Pat. No. 4,095,902 of June 20, 1978, by Lill in U.S. Pat. No. 4,097,157 of June 27, 1978, and by Senften in U.S. Pat. No. 4,126,943 of Nov. 28, 1978.

In connection with the hereinafter to be described wheel compensating means, advantage is taken of the run out compensator method disclosed in Senften U.S. Pat. No. 3,892,042 of July 1, 1975.

BRIEF DESCRIPTION OF THE INVENTION

This invention relates to improvements in vehicle wheel alignment apparatus, and is particularly concerned with the application of instrumentation mounted on the steerable and non-steerable wheel sets so that greatly improved alignment data may be found.

It is a further object of the present invention to dispose the active instruments on the various vehicle wheels by mounting means located in the most advantageous position so as to substantially nullify the physical inaccuracies in forming the wheel rims and the components of the instruments to improve the accuracy of alignment results.

It is an additional object of the present invention to provide, in addition to compensating the instruments for normal wheel run out, location of the instruments in positions so as to be substantially independent of any deviation of the wheel from the true plane of wheel rotation, whereby mechanical tolerances in wheel as well as in instrumentation components can be accounted for without substantial interference in the alignment measuring results.

A preferred embodiment comprises alignment instruments carried by the vehicle wheels in position to be compensated for wheel run out, and to be operative for measuring alignment angles of the steerable wheels from the non-steerable wheel, for measuring the alignment angles of the non-steerable wheels from the steerable wheels, and for measuring the alignment angles of the steerable wheels from each other in relation to a vehicle reference.

BRIEF DESCRIPTION OF THE DRAWINGS

The present invention is illustrated in a presently preferred form in the accompanying drawings, wherein.

DETAILED DESCRIPTION OF THE EMBODIMENT

Figures 1, 2:
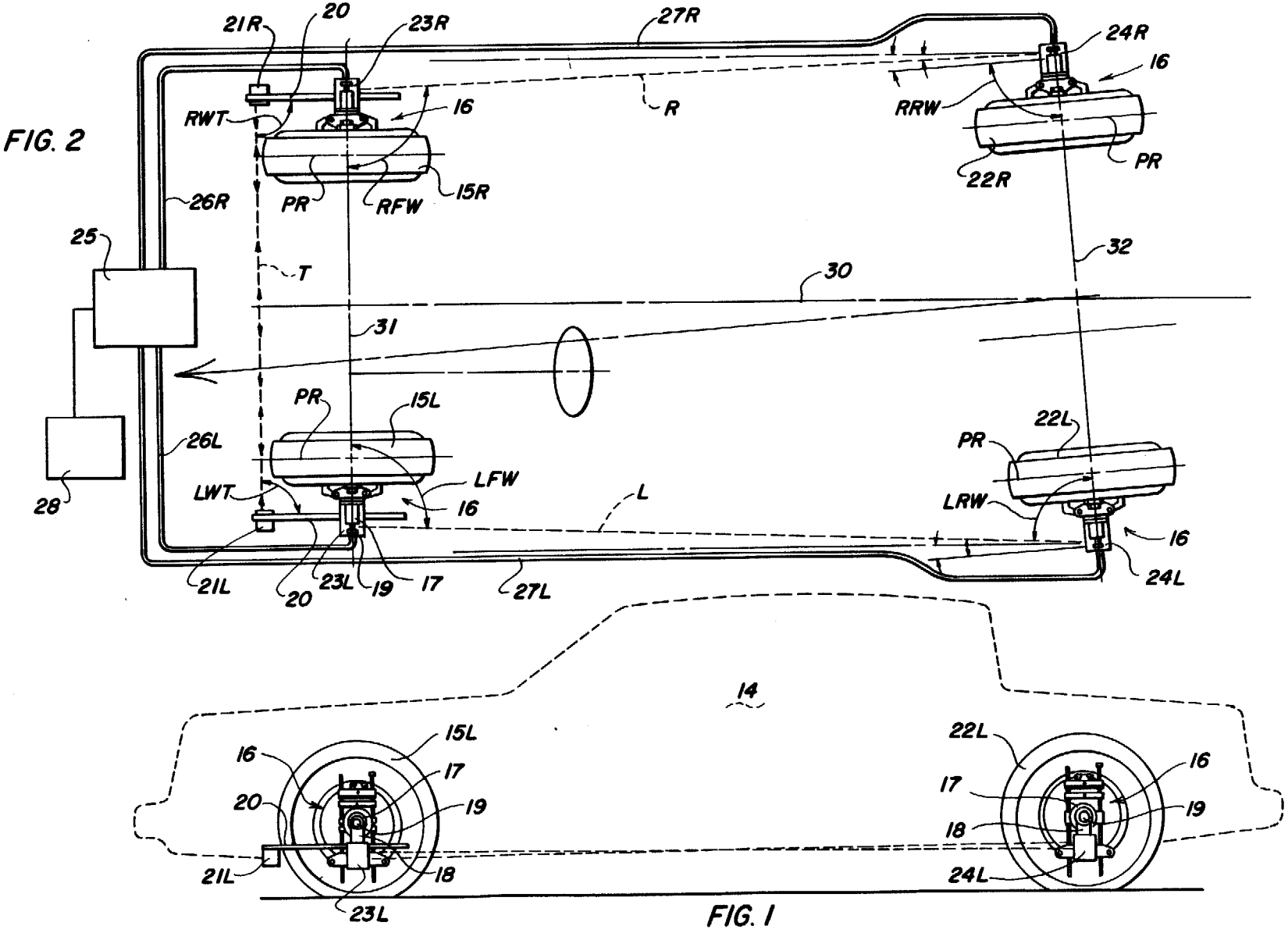
FIG. 1 is a side elevational view of steerable and non-steerable wheels related to a typical vehicle shown in silhouette.
FIG. 2 is a diagrammatic plan view of a representative alignment pattern for the wheels of the vehicle seen in FIG. 1.

Reference will now be directed to the drawings for a more complete understanding of the intent and scope of the invention presented in terms of an embodiment presently preferred. The view of FIG. 1 is of a passenger vehicle 14 which will serve to illustrate the utility of the presently preferred embodiment of the invention. As seen from the left side, the left steerable wheel 15L is shown in association with one form of an instrument support 16 adapted to grip the flange of the wheel rim. The support 16 carries a pivotal housing 17 the axis of which is substantially centerable to the spindle axis (not shown) on which the wheel 15L rotates. A bracket 18 is hung from the housing 17 so it may assume a substantially vertical position even though the wheel 15L is jacked up so it may rotate. At times, with the wheel 15L resting on its support, it may be desirable to secure the bracket 18 against pendulus movement by tightening up on a knob 19 (FIG. 2). The bracket 18, in addition to the housing 17, carries a support arm 20 which extends forwardly of the housing 18 to clear the tread of wheel 15L and be in position so that its end portion may be used for supporting an instrument device 21L. The support arm 20, or some associated part of the assembly, is usually provided with a spirit level (not shown) for purposes of locating the arm in substantially horizontal position, which positioned is retained by tightening up on the knob 19.

FIG. 1 shows the vehicle non-steerable wheel 22L to be provided with an instrument support 16 which is identical to the support attached to the steerable wheel 15L. The several parts are designated by similar reference numerals and need not be described again. It is particularly important to observe that the support 16 at the left steerable wheel 15L carries an instrument 23L and the support 16 for the left non-steerable wheel 22L carries a companion instrument 24L. These instruments 23L and 24L are made up of cooperating components which are intended to function with each other in a manner set forth in the contemporaneously filed copending patent application of James M. Grossman et al, Ser. No. 080,274, filed Oct. 1, 1979, and entitled VEHICLE WHEEL ALIGNMENT APPARATUS.

FIG. 2 shows a schematic plan view of all vehicle wheels, such as those at the left side seen in FIG. 1, and companion right side wheels 15R and 22R. The wheels at the left side are distinguished by adding the suffix "L", and those at the right side are distinguished by the suffix "R". However, each wheel 15R and 22R is provided with an instrument support 16 having the construction generally described above. Also, the support 16 on steerable wheel 15R has a support arm 20 which carries an instrument 21R to cooperate with the left side instrument 21L. In addition, the support 16 at the non-steerable wheel 22R carries an instrument 24R to cooperate with an instrument 23R carried by the support 16 at the steerable wheel 15R. These instruments 21L and 21R, as well as instruments 23R and 24R, cooperate with each other and are made up of components operating in a manner described in the said Grossman et al patent application.

In view of FIG. 2, the instruments 21L and 23L are operatively connected into a console assembly 25 by a lead 26L, and the transducer instruments 21R and 23R are similarly connected by a lead 26R to the console 25. In like manner the instruments 24L and 24R are connected respectively by leads 27L and 27R into console 25. Signal processing and alignment computation are performed in the console 25 and the results can be displayed by means indicated collectively at 28. More particularly in FIG. 2, the instruments 21L and 21R cooperate with each other in the process of measuring the angles LWT (left wheel toe) and RWT (right wheel toe). For that purpose instrument 21L has radiant energy detector means which is responsive to a source of radiant energy from instrument 21R, and instrument 21R has radiant energy detector means responsive to a source of radiant energy from instrument 21L. The essence of this cooperation is that projectors of radiant energy are disposed to direct beams in criss-cross paths transversely of the vehicle, and which paths have boundaries within the field of vision of the detector means arranged to look at the position from which the beam is projected.

In a like manner, it is indicated in FIG. 2 that instruments 23L and 24L, each containing radiant energy beam projectors and radiant energy detectors, cooperate with each other in the process of measuring the respective angles relative to a vehicle reference axis 30 which is established by a line joining the center points of the axles 31 and 32, which center points are centered between the spacing of the wheel sets 15L and 15R, and 22L and 22R. The angle LFW is formed between the axle 31 and the longitudinal line-of-sight L of the radiant energy beam from the instrument 24L at wheel 22L. The angle LRW is formed between the axle 32 and the longitudinal line-of-sight L of the radiant energy beam from the instrument 23L at wheel 15L. Similarly, the instruments 23R and 24R cooperate with each other for measuring the angles RFW and RRW by the criss-crossing of the radiant energy beams depicted by the dash line R representing the longitudinal line-of-sight between the detector means in the instruments 23R and 24R. In the example seen in FIG. 2, the wheels 15L and 15R have planes of rotation PR which are substantially perpendicular to the axle 31, while the planes of rotation PR of the wheels 22L and 22R are also substantially perpendicular to axis 33. This arrangement shows that the angles LWT and RWT are substantially ninety degrees (90°) since it is presumed that the instrument support arms 20 are substantially parallel to the planes of rotation PR for wheels 15L and 15R. However, it is shown in FIG. 2 that the tread spacing for wheels 22L and 22R is greater than for the tread spacing of the wheels 15L and 15R. In addition, wheel 22L is toed out relative to the reference axis 30 while wheel 22R is toed in relative to the same axis 30. The angular positions for the respective wheels 15L, 15R, 22L and 22R are arbitrary for purposes of illustrating the unique advantages of having active instruments at each wheel for measuring wheel position angles from each other and relative to the reference axis 30 for the vehicle.

The Transducers

Figure 7:
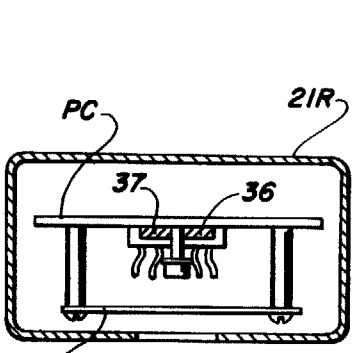
FIG. 7 is still another view of the transducer components as seen along the line 7—7 in FIG. 5.
Figure 6:
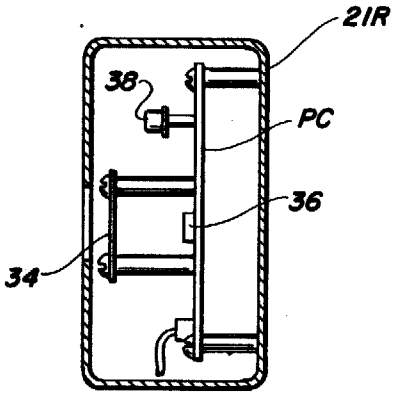
FIG. 6 is a further view of the transducer components as seen along the line 6—6 in FIG. 5.
Figure 5:
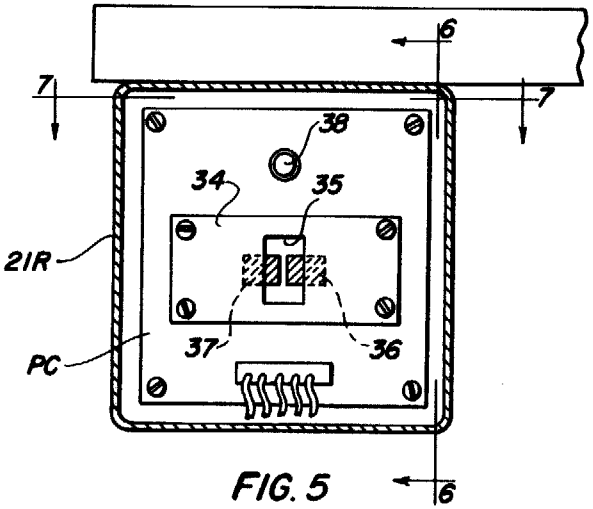
FIG. 5 is a fragmentary front view on an enlarged scale of a typical electro-optic transducer to illustrate the organization of components without particular regard to the details of the housing.

Turning now to FIGS. 5, 6 and 7, there has been shown in some diagrammatic detail a typical transducer instrument, such as the one designated at 21R in FIG. 2. It is to be understood that all of the transducer instruments 21L, 23L, 24L and 21R, 23R and 24R are substantially the same. Thus, the instrument 21R has a panel 34 formed with an aperture 35 used to control the radiant energy beam. The aperture 35 may be produced photographically as a transparent area in an opaque material, or the aperture may be an opening in a sheet of solid material. At a suitable distance behind the aperture 35 there are mounted a pair of photodiodes 36 and 37. The width of the aperture 35 is substantially equal to the width of the face of either one of these photodiodes, and it is centered so that, in a null position with radiant energy impinging at 90° to the plane of panel 34, the exposure of each photodiode to the radiant energy should be substantially equal. The photodiodes are carried by a printed circuit board PC which also carries preamplifiers for converting the photodiode output current into voltage, and the operative electronic components associated with radiant energy emitter means 38 which illuminate a cooperative transducer instrument attached to an adjacent wheel. The photodiodes 36 and 37 are illuminated by the radiant energy emitter means of that cooperative transducer instrument.

Figure 8:
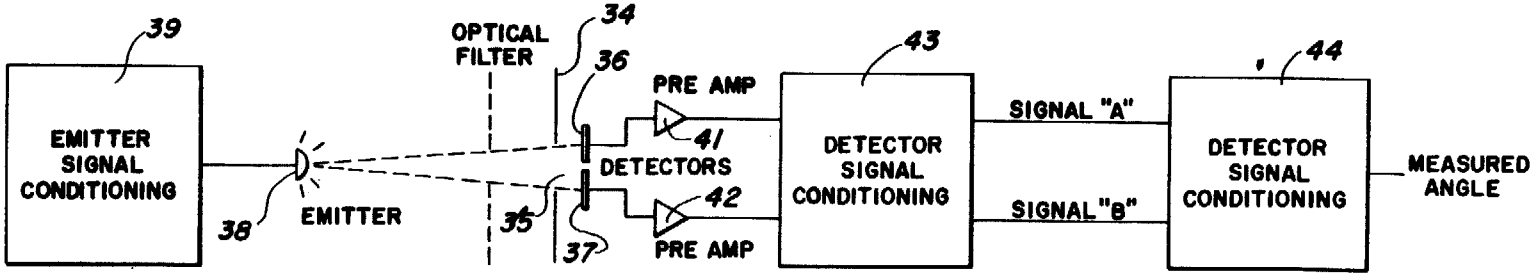
FIG. 8 is a block diagram of the electronic circuitry in which one typical emitter-detector transducer combination has been shown in association with signal computation means.

FIG. 8 is a schematic block diagram of a typical electronic transducer instrument composed of signal conditioning means 39 connected to an emitter 38. The radiant energy beam generated by the emitter 38 is directed at detector means in another instrument spaced therefrom where such other instrument has a pair of detectors 36 and 37 located behind a window 35 in an opaque mask 34. The detectors may be photodiodes having preamplifier means 41 and 42 for converting the current generated in the photodiodes into voltage. These voltage signals are processed in conditioning means 43 to produce output signal A from detector means 41 and output signal B from detector means 42, which serves the purpose of electronically filtering the detector amplifier signals to isolate the emitter signals and eliminate interference due to noise and ambient light. The filters are matched to the characteristics of the emitter signals, which may be square wave or sine wave at audio frequency (10 KHz for example) so that the detector signals are conditioned by bandpass filters whose center frequency matches the emitter signal. In order to obtain angular information the detector signals from the preamplifiers 41 and 42 and means 43 must be processed in separate circuits (or in time shared circuit means) in signal computer means 44 so as to be able to produce results which can be displayed. When optical filter means 45 is employed it is positioned over the aperture 35 and is selected to have transmission characteristics which maximizes all other light.

Figure 9B:
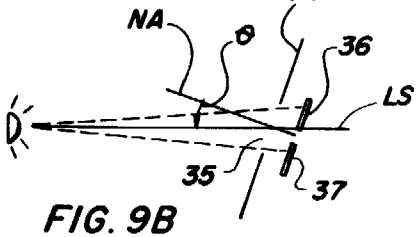
FIGS. 9A and 9B are diagrams of the transducer components and their effects on the optical path of the radiant energy beam projected from an emitter.
Figure 9A:
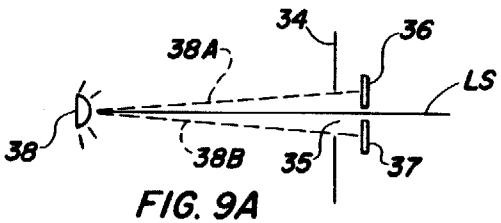

Reference will now be directed to FIGS. 9A and 9B to present a full description of the interaction of the component parts of the tranducer. The boundary of the portion of the radiant energy beam from emitter 38 falling through aperture 35 is shown by the dashed lines 38A and 38B. The center of the beam is denoted the line of sight LS. In FIG. 9A the line of sight LS is coincident with the normal axis of the aperture 35. This is the null position in which equal amounts of energy fall on detectors 36 and 37. In FIG. 9B the detector and aperture assembly, and hence the normal axis NA, is rotated from the line of sight LS. As seen in the drawing, the effect of the aperture 35 is to bound the energy beam such that more light now falls on detector 36 than on detector 37. The electronic current flowing in each detector is proportional to the amount of light incident upon it. The detector signal conditioning means 43 of FIG. 8 must measure these currents and convert them to a DC voltage suitable for signal computation.

A further unique feature of the present embodiment is the way the measuring instruments are mounted on or supported by the vehicle wheels. The views of FIGS. 3A and 3B will serve to show that mechanical run out present in the wheel, as well as tolerances present in the wheel and instrument, does not materially affect the operation of the instruments 21R and 23R. It is assumed in this case that the instrument 23R is provided with run out compensation means of the type disclosed in Seften U.S. Pat. No. 3,892,042 (supra) so that the instrument has obtained for its electronic memory the data developed by rotating the wheel 15R from a starting position to a position at 180 degrees of rotation displaced from the start, and computing the average of any run out disturbance generated in that change of position. For example in FIG. 3A, the instrument 23R has an ideal position on the axis X—X of wheel rotation. However, the components may have mechanical deviations or physical irregularities from a perfectly formed system, in which case the instrument might be located off the axis X—X to the extent of the angle D. Since the irregularities or deviations are local to the wheel 15R, the path along which the instrument may be positioned is the arc C. The chordal portion of the arc C joining the possible extremes of the angle D is substantially a straight line that essentially coincides with the compensated plane of rotation of wheel 15R. The mechanical deviation or physical irregularities which may be present in any vehicle wheel and also present in an instrument attached thereto include production tolerances in the components, misshaped wheels, and similar departures from an ideal mechanical assembly. While each instrument 23L, 23R, 24L and 24R embodies the electronic means disclosed in FIG. 5 of Senften U.S. Pat. No. 3,892,042 to compensate for wheel wobble to find the plane of wheel rotation it also embodies the means of FIG. 8 herein, or it may embody means of the character seen in Senften U.S. Pat. No. 4,126,943.

Figure 3A:
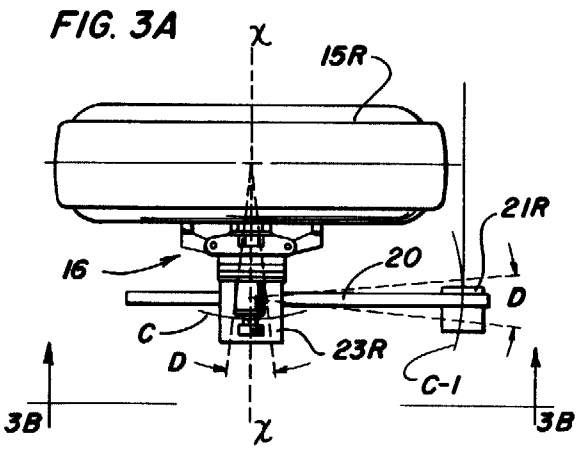
FIG. 3A is a diagrammatic view of a vehicle wheel and cooperating alignment instrumentation to illustrate the negligable effect of mechanical variations in the structure.
Figure 3B:
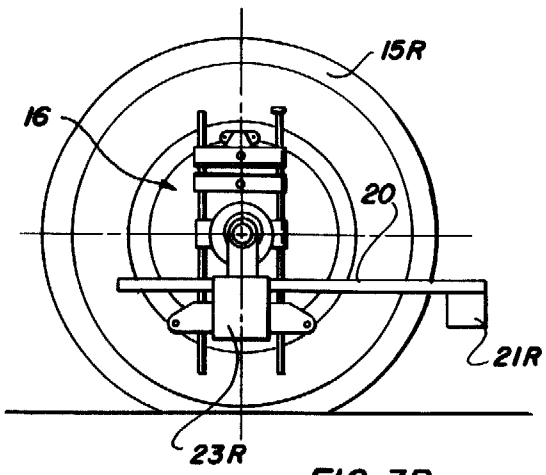
FIG. 3B is a side elevation view taken along line 3B—3B in FIG. 3A.

In the views of FIGS. 3A and 3B it can be seen that the instrument 21R is carried on a support 20 which is directly related with the instrument 23R. Assuming that the support 20 is related at ninety degrees to the axis X—X for the wheel 15R, it must follow that the angle D of deviation of the instrument 23R, as above outlined, will also be the same angle D of deviation for instrument 21R. Both instruments 21R and 23R are seen to assume positions along a substantially straight line or chord of the arc C and C-1, which positions are dictated by the presence of mechanical run out in the system. Each instrument embodies radiant energy emitter means and radiant energy detector means sensitive to received radiant energy, but the possible amount of deviation of the line-of-sight is insignificant and can be disregarded.

Figure 4:
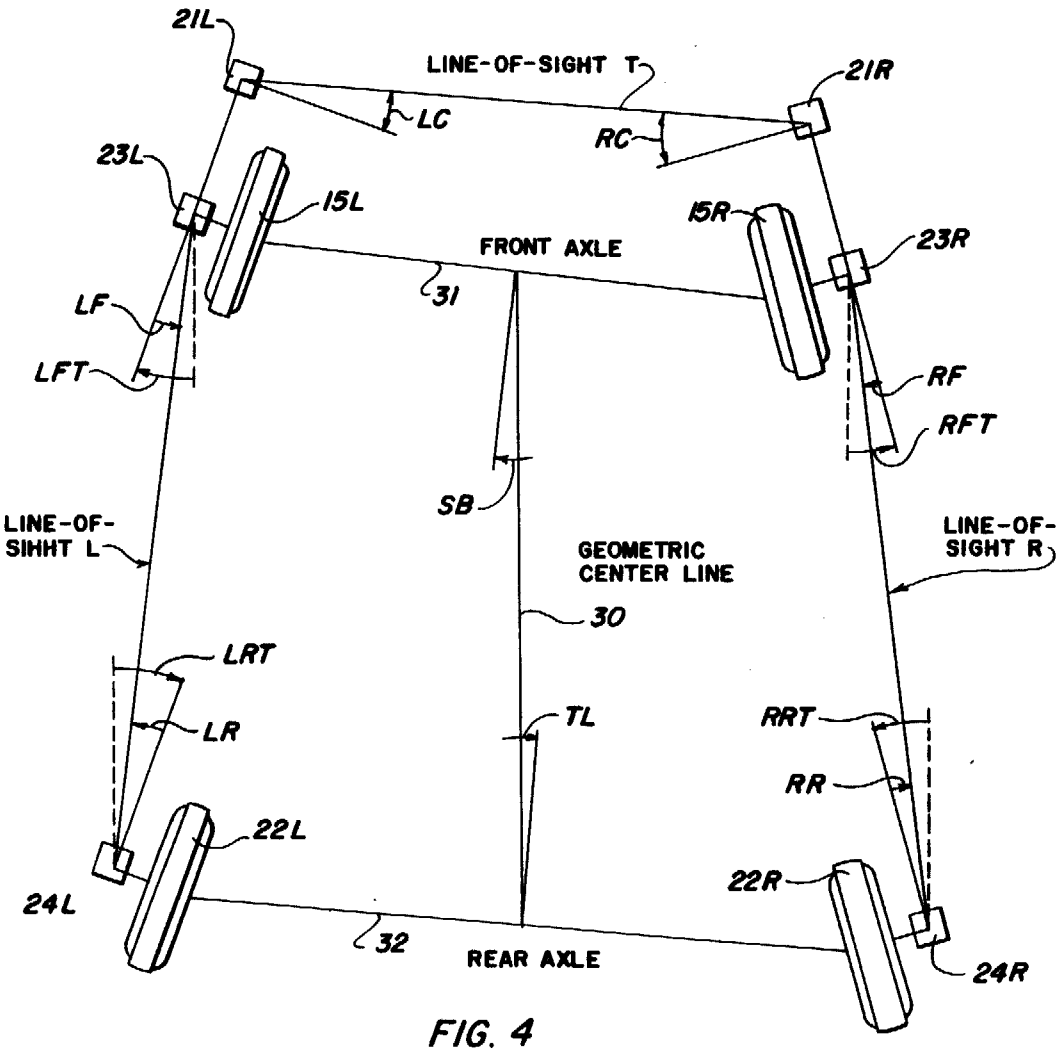
FIG. 4 is a diagrammatic layout of the vehicle wheels for the purpose of illustrating the measurement of the angles of the respective wheels relative to a geometric center line.

FIG. 4 is a diagrammatic view of the wheels 15L, 15R, 22L and 22R of the vehicle 14 of FIGS. 1 and 2, but in this view the wheels have been intentionally misaligned to illustrate the geometry of wheel alignment investigation using the foregoing principle instrumentation. The instruments are generally shown and designated by the reference characters appearing in FIG. 2, and the alignment is calculated with reference to a geometric center line 30 (FIGS. 2 and 9) of the vehicle. It is necessary to understand that there is a line-of-sight T between the instruments 21L and 21R which represents the radiant energy beam path from the respective instruments 21L and 21R. The line-of-sight may not be the center of the beam, but the beam has a sufficient spread or fan to be seen by the opposing beam sensors. Normally the wheels will not be so far out of alignment as is depicted in FIG. 4 that the beam will not be seen. In like manner there is a line-of-sight L between the instruments 23L and 24L representing the radiant energy beam path from the respective instruments 23L and 24L. The line-of-sight R between the instruments 23R and 24R depicts the path of the radiant energy beams from those respective instruments. There are construction lines on the drawing of FIG. 4 to assist in visualing the angles to be investigated, such as the dash lines which are parallel to the geometric center line 30, and act as a reference for the angles. It is herein assumed that all measured angles have been compensated electronically for wheel run out, as disclosed in the Senften U.S. Pat. No. 3,892,042, to eliminate from the following description need to complicate the calculations.

The angles indicated in FIG. 4 are shown in tabular form with reference to the position of the beam projectors, and beam sensors used to determine those angles.

| Projector Location | Sensor Location | Measured Angle |
|---|---|---|
| Right front toe arm | Left front toe arm | Left cross LC |
| Left front toe arm | Right front toe arm | Right cross RC |
| Left rear wheel | Left front wheel | Left front longitudinal LF |
| Right rear wheel | Right front wheel | Right front longitudinal RF |
| Left front wheel | Left rear wheel | Left rear longitudinal LR |
| Right front wheel | Right rear wheel | Right rear longitudinal RR |

The signal information about the angles LC, RC, LF and RF is produced in the respective instruments (see FIG. 8) and the results are fed into the alignment computer 25 where the following computations relative to the geometric reference line 30 are worked out for the several angles pertinent to the alignment determination, as follows:

| The angles computed | The computation |
|---|---|
| LFT (left front toe) | $\frac{1}{2}(LC + RC + LF - RF)$ |
| RFT (right front toe) | $\frac{1}{2}(LC + RC - LF + RF)$ |
| TFT (total front toe) | $LFT + RFT = LC + RC$ |
| SB (set back) | $\frac{1}{2}(RC - LC + LF - RF)$ |
| LRT (left rear toe) | $LFT - LF + LR = (LC + RC - LF - RF) + LR$ |
| RRT (right rear toe) | $RFT - RF + RR = \frac{1}{2}(LC + RC - LF - RF) + RR$ |
| TRT (total rear toe) | $LRT + RRT = LC + RC - LF - RF + LR + RR$ |
| TL (thrust line) | $\frac{1}{2}(LRT - RRT) = \frac{1}{2}(LR - RR)$ |
| LFTTH (left front toe relative to thrust line) | $LFT - TL$ |
| RFTTH (right front toe relative to thrust line) | $RFT + TL$ |

After the computation has been made it is in a form suitable for driving the display 28. The display may be a group of meters (not shown) for showing the values of the computed angles identified in the left column above. It is usual in the make up of display 29 to provide meters and circuit selectors for connecting the meters selectively to display left, right and total toe for the steerable wheels, or left, right and total toe for the non-steerable wheels, or wheel set back, or the relationship of steerable wheel toe relative to the thrust line for the non-steerable wheels.

In view of the foregoing disclosure it is apparent that the present apparatus has certain unique characteristics which are adapted to produce more accurate vehicle wheel alignment information by means which enables an alignment service shop to determine quickly and easily the respective angular relationships of the individual wheels of a vehicle with respect to a vehicle reference line. A unique feature resides in the way that the instruments are mounted on the respective wheels so that signals representative of the individual wheel positions are generated directly and can be fed into a remote computer console for computation and display. In the mounting of the instruments at each of the vehicle wheels a support is selected for the instrument to place it in a position such that the instrument will be substantially independent of any mechanical irregularities of the character above defined. This latter feature is disclosed in FIGS. 3A and 3B where it has been disclosed that mechanical irregularities might result in positioning the instrument 23R at any place along the path of arc C, and regardless of the precise position along this arc, the emitter and detector means will not be displaced to any significant degree since there is extremely slight shifting of the poisition away from the arcuate path C. In like manner, with respect to the instrument carried by the front support arm, instrument 21R on the support 20 would be insignificantly displaced since the emitter and sensor would be moving in the arcuate path C-1 which has only slight lateral displacement of an amount that can be ignored.

The present disclosure has set forth a unique arrangement for vehicle wheel alignment apparatus which will produce greatly improved accuracy in determining the position of the respective vehicle wheels relative to a vehicle reference line, which in connection with the view of FIG. 2 has been indicated to be the geometric center line of the vehicle. While the foregoing disclosure has set forth a preferred embodiment of the present invention it should be understood that variations therefrom may come to mind after the principals of the disclosure have been understood, and it is desired to include all reasonable variations within the scope of this disclosure.

What is claimed is:

1. In apparatus for determining the alignment positions of vehicle wheels in relation to a reference axis of the vehicle and to the thrust line of the non-steerable wheels, the improvement which comprises:

(a) first alignment determining instruments carried by each of a set of steerable wheels so as to be in a substantially vertical plane containing the axis of rotation of said steerable wheels;

(b) second alignment determining instruments carried by each of a set of non-steerable wheels so as to be in a substantially vertical plane containing the axis of rotation of said non-steerable wheels;

(c) third alignment determining instruments supported from said steerable wheels in position to be in line-of-sight with each other transversely of the vehicle;

(d) radiant energy beam projectors and beam sensors in each of said first, second and third alignment determining instruments in positions such that the radiant energy beams from first instruments are in the line-of-sight to be sensed by said beam sensors in second instruments, radiant energy beams from second instruments are in the line-of-sight to be sensed by said beam sensors in first instruments, said first and second instruments are arranged in cooperating pairs along opposite longitudinal sides of the vehicle so as to be spaced in the longitudinal direction between said steerable and non-steerable wheels; and (e) radiant energy beam projectors and beam sensors in said third alignment determining instruments in positions of cooperation transversely of the vehicle adjacent the steerable wheels, whereby said first and third instruments cooperate to generate signals determinative of the alignment positions of the steerable wheels relative to the vehicle reference axis and said second instruments cooperate with said first instruments to generate signals determinative of the thrust line effect of the non-steerable wheel on said steerable wheels.

2. Apparatus for determining the angular relationship of the steerable and non-steerable wheels of a vehicle relative to a longitudinal reference axis of the vehicle and the thrust line of the non-steerable wheels, the apparatus being associated with the wheels in sets longitudinally spaced a distance representing the vehicle wheel base and the wheel tread width, said apparatus comprising:

(1) first and second wheel position determining instruments carried by each wheel of the steerable wheel set;

(a) a first one of said instruments being in line-of-sight with each other transversely of the vehicle;

(2) a single angle determining instrument carried by each non-steerable wheel in position to be in line-of-sight with a second instrument carried by a steerable wheel at the same longitudinal side of the vehicle, (a) said single instruments and said second instruments being located in substantial alignment with the axis of rotation of the vehicle wheels on which each is carried, such that each instrument represents the plane of wheel rotation;

(3) and all of said instruments being cooperatively operable for generating signals representative of the positions of the individual wheels in said sets for determining the thrust line positions of the non-steerable wheels relative to the longitudinal reference axis of the vehicle, and for determining the effect on the positions of the steerable wheels of the thrust line alignment of the non-steerable wheels.

3. Apparatus for determining the angular alignment relationship of the steerable and non-steerable wheels of a vehicle relative to a longitudinal reference axis of the vehicle to the thrust line of the non-steerable wheels, the apparatus being associated with the arrangement of the longitudinally and transversely spaced wheels representing the vehicle wheel base and tread width dimensions, said apparatus comprising:

(1) a pair of alignment determining instruments mounted on each of the steerable wheels, (a) with a first one of said instruments on each steerable wheel being positioned to align substantially with the axis of wheel rotation so as to have a minimum of lateral displacement to the vehicle longitudinal reference axis upon turning of the steerable wheels, (b) and a second one of said instruments on each steerable wheel being positioned forwardly of the wheels so that said second instruments are in position for obtaining cooperation therebetween transversely of the vehicle wheels;

(2) a single measuring instrument on each of the non-steerable wheels in position to align substantially with the axis of wheel rotation, such that each instrument represents the plane of wheel rotation, (3) said first ones of said instruments being positioned to be in alignment determining cooperative relationship with said single instruments positioned at the same side of the vehicle wheel base, and said second ones of the instruments being in alignment determining cooperative relationship with each other across the tread width of the vehicle, (a) said instruments generating signals representive of the position of the respective wheels relative to the vehicle reference axis and the thrust line of the non-steerable wheels;

(4) and alignment computer means operatively connected with each of said instruments and including means to display the values of the computed angles from the signals generated by said instruments, (a) such that the toe alignment determination of the steerable wheels and the non-steerable wheels and the thrust line alignment determination of the non-steerable wheels is displayed in relation to the vehicle longitudinal reference axis.

4. Apparatus for determining the existing alignment of the steerable and non-steerable vehicle wheels relative to a longitudinal reference axis of the vehicle and to the thrust line of the non-steerable wheels, in which the apparatus comprises:

(1) six alignment determining instruments, each embodying a radiant energy projector and signal generating radiant energy sensor means mounted such that (a) each non-steerable vehicle wheel supports one instrument in position to represent the plane of rotation of that wheel and in alignment with its axis of rotation, (b) each steerable vehicle wheel supports a first instrument in position to represent the plane of rotation of that wheel and in alignment with its axis of rotation, and (c) each steerable vehicle wheel also supports a second instrument in position to represent the angular position of the plane of rotation of that wheel relative to the longitudinal reference axis of the vehicle;

(2) said one instrument at each non-steerable wheel being in line-of-sight with said first instrument at each steerable wheel at the same longitudinal side of the vehicle for mutual cooperation therewith, such that (a) the radiant energy sensors in said one instrument and said first instrument are energized by the radiant energy projected from the projectors in said first instrument and said one instrument respectively;

(3) said second instruments being in mutual cooperative line-of-sight positions such that (a) the radiant energy sensor in each instrument is energized by the radiant energy projected from the projector in the cooperative instrument;

(4) said signals generated by said sensors representing the position of the respective vehicle wheels;

(5) and means operatively connected to each individual instrument for processing the signals generated by each of said radiant energy sensors such that (a) the toe alignment of the steerable wheels and the toe alignment and thrust line of the non-steerable wheels is determined in relation to the longitudinal reference axis of the vehicle.

*5. A wheel alignment measuring apparatus designed for measuring wheel alignment angles of the vehicle having front and rear wheels and comprising:*

*six angle measuring units,*

*first and second said angle measuring units adapted for connection respectively to the left and right front wheels of the vehicle and including angle pickup means for measuring and producing signals indicating the total tracking angles of both front wheels,*

*third and fifth said angle measuring units adapted for connection respectively to the left front wheel and a left rear wheel and including angle pickup means for measuring and producing signals indicating the angles of these wheels,*

*and fourth and sixth said angle measuring units adapted for connection respectively to the right front wheel and a right rear wheel and including angle pickup means for measuring and producing signals indicating the angles of these wheels,*

*means rigidly joining the first said angle measuring unit with said third angle measuring unit,*

*means rigidly joining said second angle measuring unit with said fourth angle measuring unit, and*

*an electrical circuit means for receiving signals from said angle pickup means and for producing a reading for wheel alignment data from the angles measured by said angle measuring units.*

*6. The structure as claimed in claim 5 wherein said angle measuring units have relative placements and polarities arranged to cut out effects produced by track differences and wheel base differences so that output readings are produced free of such differences.*

* * * * *

UNITED STATES PATENT AND TRADEMARK OFFICE

CERTIFICATE OF CORRECTION

PATENT NO. : Re. 33,144

DATED : Jan. 9, 1990

INVENTOR(S) : Lee Hunter and Daniel B. January

It is certified that error appears in the above-identified patent and that said Letters Patent is hereby corrected as shown below:

On the title page, in item [64], "Patent No.: 3,021,047" should be --Patent No.; 4,302,104--.

Signed and Sealed this

Twenty-fifth Day of August, 1992

*Attest:*

DOUGLAS B. COMER

*Attesting Officer*

*Acting Commissioner of Patents and Trademarks*

US001033144A

REEXAMINATION CERTIFICATE (2331st)

United States Patent [19]

[11] B1 Re. 33,144

Hunter et al.

[45] Certificate Issued Jul. 12, 1994

[54] VEHICLE WHEEL ALIGNMENT APPARATUS

[75] Inventors: Lee Hunter, Creve Coeur; Daniel B. January, Bel-Ridge, both of Mo.

[73] Assignee: Hunter Engineering Company, Bridgeton, Mo.

Reexamination Request:
No. 90/003,153, Aug. 5, 1993

Reexamination Certificate for:

| | |
|---|---|
| Patent No.: | Re. 33,144 |
| Issued: | Jan. 9, 1990 |
| Appl. No.: | 443,381 |
| Filed: | Nov. 22, 1982 |

Certificate of Correction Issued: Aug. 25, 1992.

Related U.S. Patent Documents

Reissue of:

| | | |
|---|---|---|
| [64] | Patent No.: | 4,302,104 |
| | Issued: | Nov. 24, 1981 |
| | Appl. No.: | 81,102 |
| | Filed: | Oct. 2, 1979 |

[51] Int. Cl.[5] ..... G01B 11/26; G01B 5/24

[52] U.S. Cl. ..... 356/152; 33/203.18; 33/288; 356/155

[58] Field of Search ..... 356/141, 152, 155; 33/203.18, 288, 336, 337

[56] References Cited

U.S. PATENT DOCUMENTS

| | | |
|---|---|---|
| 3,164,910 | 1/1965 | Manlove . |
| 3,181,248 | 5/1965 | Manlove . |
| 3,417,479 | 12/1968 | Hirmann . |
| 3,782,831 | 1/1974 | Senften . |
| 3,855,709 | 12/1979 | Hirmann . |
| 3,865,492 | 2/1975 | Butler . |
| 4,095,902 | 6/1978 | Florer et al. . |
| 4,106,208 | 8/1978 | Hunter . |
| 4,126,943 | 11/1978 | Senften . |
| 4,383,370 | 5/1983 | Van Blerk et al. . |

OTHER PUBLICATIONS

Norton Proposal for the Daimler-Benz Wheel Aligner (May, 1979).

*Primary Examiner*—Stephen C. Buczinski

[57] ABSTRACT

Vehicle wheel alignment apparatus having active alignment determining means operatively mounted on the steerable and non-steerable wheels so as to be substantially insensitive to mechanical distortion of the vehicle wheels and operable in combination with wheel run out compensation means to produce wheel alignment results of improved accuracy, and utilizing the improved arrangement of alignment apparatus for supplying information which can be used for computing the important angular relationship of the wheels to a vehicle reference.

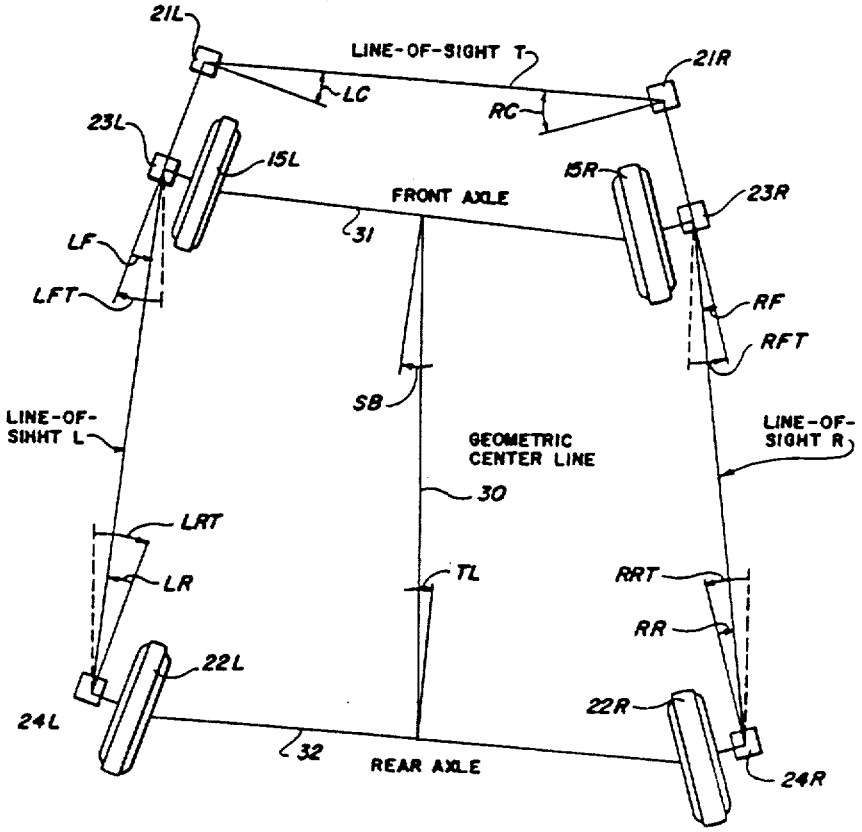

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-5 and 6 is confirmed.

* * * * *